(12) United States Patent
Livolsi

(10) Patent No.: US 6,384,661 B1
(45) Date of Patent: May 7, 2002

(54) MULTI LEVEL JITTER PRE-COMPENSATION LOGIC CIRCUIT FOR HIGH SPEED DATA LINKS

(75) Inventor: Robert R. Livolsi, Shokan, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/584,027

(22) Filed: May 30, 2000

(51) Int. Cl.[7] .......................... H03K 17/16; H03B 1/00
(52) U.S. Cl. ........................................ 327/379; 327/108
(58) Field of Search ................................ 327/108, 310, 327/384, 379, 407, 391

(56) References Cited

U.S. PATENT DOCUMENTS

| | | | |
|---|---|---|---|
| 4,818,950 A | 4/1989 | Ranger ....................... 328/155 |
| 5,777,501 A | * 7/1998 | Abouseido ................... 327/274 |
| 5,939,929 A | 8/1999 | Tsinker ....................... 327/391 |
| 6,016,082 A | 1/2000 | Cruz et al. ............. 331/117 FE |
| 6,052,810 A | * 4/2000 | Creek .......................... 324/763 |

* cited by examiner

Primary Examiner—Dinh T. Le
(74) Attorney, Agent, or Firm—Lynn L. Augspurger

(57) ABSTRACT

A circuit and method for decreasing the amount of jitter present at the receiver input of high speed data links which uses a driver circuit for input from a high speed data link which comprises a logic circuit having a first section (1) which provides data latches, a second section (2) which provides a circuit generates a pre-destorted output and for compensating for level dependent jitter having an OR function element and a NOR function element each of which is coupled to two inputs and to a variable delay element as an input which provides a bimodal delay for pulse width pre-distortion, a third section (3) which provides a muxing circuit, and a forth section (4) for clock distribution in the driver circuit circuit. A fifth section is used for logic testing the driver circuit.

2 Claims, 1 Drawing Sheet

_US 6,384,661 B1_

MULTI LEVEL JITTER PRE-COMPENSATION LOGIC CIRCUIT FOR HIGH SPEED DATA LINKS

RELATED APPLICATIONS

This application is related to the application Ser. No. 09/584,028, filed May 30, 2000 concurrently herewith of Robert R. Livolsi entitled "Variable Delay Element for Jitter Control in High Speed Data Links".

FIELD OF THE INVENTION

This invention relates to driver circuits which are particularly used as driver elements in a High Speed Data link to provide control of jitter in an output signal.

TRADEMARKS

S/390 and IBM are registered trademarks of International Business Machines Corporation, Armonk, N.Y., U.S.A. Other names may be registered trademarks or product names of International Business Machines Corporation or other companies.

BACKGROUND

Signal drivers for high speed data links are known, as illustrated by U.S. Pat. No. 5,939,929, granted Aug. 15, 1999 entitled "Low jitter low power single ended driver" which could be used for ethernet repeaters and which produced a symmetric and therefor low jitter output signal in response to an input signal. This circuit required a first and second constant current which were combined to produce an output signal which was symmetric to the input signal received by the terminal circuit. For gigahertz frequencies Sun Microsystems, Inc. engineers designed a low phase noise LC oscillator for microprocessor clock distribution as described in U.S. Pat. No. 6,016,082, granted Jan. 18, 1992, where a continously modifiable gigahertz frequency VCO circuit generated an output signal with a frequency that was dependent on the voltage on a control voltage input line. This output signal was provided to a level shifter output circuit which converts the current signal to a single-ended voltage that is supplied to the output driver which provides the output signal to a clock distribution network.

In spite of these recent efforts, a review of the patent literature shows a failure to recognize that there is jitter which is produced by pre-emphasis or pre-distortion on a driver, and pre-emphasis has become desirable, as illustrated by t he iniband standard being developed.

SUMMARY OF THE INVENTION

This invention relates to the method described for decreasing the amount of jitter present at the receiver input of high speed data links which uses a driver circuit for input from a high speed data link which comprises a logic circuit having a first section (1) which provides data latches, a second section (2) which provides a circuit which generates a pre-destorted output and for compensating for level dependent jitter having an OR function element and a NOR function element each of which is coupled to two inputs and to a variable delay element as an input which provides a bi-modal delay for pulse width pre-distortion, a third section (3) which provides a muxing circuit, and a forth section (4) for clock distribution in the driver circuit.

The preferred embodiment of the invention is a method of controlling jitter on the driver circuit which includes: storing in said first section (1) the data that is being sent and the last two bits history of the information being sent; and skewing the stored history by one half of the cycle of the bit time of said circuit; and then passing the data to the third section and serializing the data by passing the data through said muxing circuit; timing information for said skewing and serialization being provided by said fourth section; and after said skewing and serialization steps, the second section samples the information in the first section and adjusts the timing information of said forth section to compensate the serialization of the third section for jitter.

A fifth section (5) is used for providing a logic test for the driver circuit.

The driver circuit of the present invention allows for level pre-emphasis in a driver, and yet compensates for level deployed jitter proved by pre-emphasis or pre-distortion on a driver signal to reduce the amount of jitter present at the receiver input of high speed data links. In accordance with the invention, I will describe a method for "pre-distorting" the data in both amplitude and pulse width in order to reduce overall jitter. A multi-level method for properly ratioing pulse width amplitudes and pre-compensating for pulse width distortion is presented.

For completeness, while not developed at the request of the U.S. Government, this invention has been secretly demonstrated for use in a 2 gigabit per second links for the U.S. government. The U.S. Government is understood not to have any ownership interest in the invention.

These and other improvements are set forth in the following detailed description. For a better understanding of the invention with advantages and features, refer to the description and to the drawings.

Figure 1:
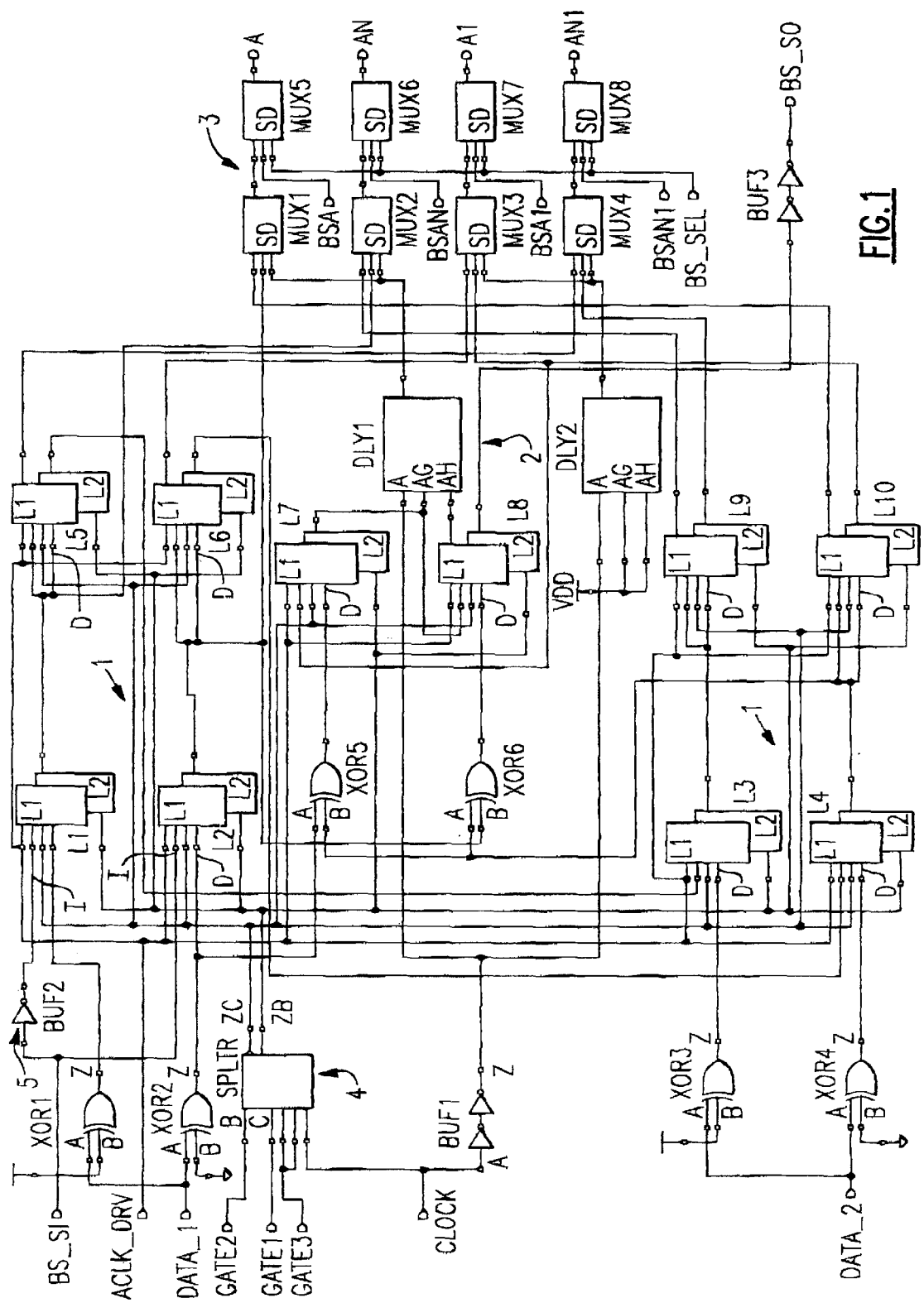
FIG. 1 illustrates the principles of my invention.

The detailed description explains the preferred embodiment of the invention, together with advantages and features, by way of example with reference to the drawing.

DETAILED DESCRIPTION OF THE INVENTION

The method described is used to decrease the amount of jitter present at the receiver input of high speed data links. Level dependent jitter is sometimes known as deterministic jitter. Jitter is the variation in pulse width of data and is caused by many components as outlined in a "jitter budget". The end result of jitter is the reduction of the data detection window, known as the "eye". As the total sum of the jitter components increases, the eye begins to collapses, eventually closing, limiting the bandwidth of the system. This preferred embodiment of the invention pre-distorts the rising and falling edge of certain data patterns to reduce jitter as compared to unacceptable other attempts not discussed in detail here which vary amplitude at the transmitter end of a high speed link or attempted to equalize the data at the receiver input.

As illustrated in FIG. 1, a logic circuit consisting of five (5) sections has a first section one (1) which provides data latches for amplitude distortion. A second section two (2) provides a pulse width pre-distortion circuit. A third section three (3) provides a muxing circuit. A forth section (4) is a clock distribution circuit and a final section five (5) provides a test circuit.

There are three primary inputs, CLOCK, DATA_1, DATA_2. There are respectively four primary outputs, A, AN, A1, AN1. There are two test inputs, BS_SI, and ACLK_DRV. And there are one test output, BS_SO. There are three control inputs, GATE1, GATE2 and GATE3. These are DC inputs only and remain unchanged.

As shown in section one (1), the primary input; DATA_1, as input to pin A of exclusive-or gate, XOR1, and positive potential VDD as input to pin B of exclusive-or gate XOR1 establish the logical Boolean expression for the inverse of DATA_1 on its output pin Z. This is also the input to pin A of exclusive-or gate XOR2 and has a positive potential of zero volts applied to pin B of exclusive-or gate XOR2 establishing the Boolean expression for the exact representation of DATA_1, whose respective outputs each applied to input data pins, D of the data latches L1 and L2. Similarly, primary input; DATA_2, as input respectively to the A pins of exclusive-or gates XOR3 and XOR4, with a positive potential, VDD as input to pin B of XOR3 and positive potential of zero volts to pin B of XOR4, respectively establishing the Boolean expression for the inverse of PDATA_2 on the output of XOR3 and establishing the Boolean expression for the exact representation of DATA_2 on the output or exclusive-or gate XOR4, where each output of the exclusive-or gates XOR3 and XOR4 respectively driving the data input pins, D of the data latches, L3 and L4. The respective outputs of data latches L1, L2, L3, L4, are launched on the rising edge of ZB; the output of clock splitter, SPLTR1. These in turn respectively drives the data inputs, D of the data latches L5, L6, L7, L9, L10.

As shown in section (2), the outputs of XOR2 and L4 respectively driving the A and B inputs of XOR5 and the outputs of L4 and L6 respectively driving the A and B inputs of XOR6. The outputs of logic gates XOR5 and XOR6 each respectively drive the data input pins, D of sampling latches L7 and L8. The output of sampling latch, L7 is launched on the rising edge of the clock derived from pin ZB of the clock splitter; SPLTR, while the output of sampling latch L8 is launched on the rising edge of clock derived from pin ZC of clock splitter (SPLTR). The outputs of latches L7 and L8 each respectively drives the input pins AG and AH of the variable delay element DLY1. The output of BUF1 drives the input pin, A of the variable delay elements, DLY1 and DLY2, while the AG and AH inputs of variable delay element DLY2 is driven by the positive supply of VDD. The output of the variable delay element, DLY1 and DLY2 each respectively drives the SD pins of MUX1, MUX2, and MUX3, MUX4. This section senses and makes a decision relative to the incoming data patterns and appropriately adjusts the rising and/or falling edge of the select signals for MUX1 and MUX2.

As shown in section Three (3), the primary inputs, DATA_1 and DATA_2 are parallel streams of data that are interleaved by the action of the data sample latches L1–L6 and L9 and L10 and mux's MUX1–MUX4. The output of latch L2 and L10, are launched by the rising edge of the ZC and ZB clocks respectively and are skewed by a half a bit time and then muxed together by MUX1. Similarly the l2 output of latch L1, and the l1 output of latch L9 are muxed together by MUX2, and the l1 output of latch L6, and the l2 output of latch L10, are muxed together at MUX3, and the l1 output of latch L5 and the l2 output of latch L9 are muxed together at MUX4, forming the inputs respectively to jtag input muxes, MUX5–MUX8, deriving output signals A, AN, A1, AN1 respectively.

As shown in section Three (3), the primary inputs, DATA_1 and DATA_2 are parallel streams of data that are interleaved by the action of the data sample latches L1–L6 and L9 and L10 and mux's MUX1–MUX4. The output of latch L2 and L10, are launched by the rising edge of the ZC and ZB clocks respectively and are skewed by a half a bit time and then muxed together by MUX1. Similarly the L2 output of latch L1, and the L1 output of latch L9 are muxed together by MUX2, and the L1 output of latch L6, and the L2 output of latch L10, are muxed together at MUX3, and the L2 output of latch L5 and the L2 output of latch L9 are muxed together at MUX4, forming the inputs respectively to jtag input muxes, MUX5–MUX8, deriving output signals A, AN, A1, AN1 respectively.

As shown in section five (5): The test input, BS_SI, is buffered by BUF2 which drives the input pin I of data latch L1 which is enabled by the test clock ACLK_DRV. The L2 output is then serpentined to the respective datalatches, L5, L3 and L9. Also, the input test signal is sent to the I input of latch's L2, L6, L4, L10, L7 and L8 where the L2 output of latch L8 drives the input of BUF3, which in turn drives output pin BS_SO.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for decreasing jitter present at a receiver input of a high speed data link which comprises the steps of:

coupling a driver circuit for input from said high speed data link of high speed data at a data input pin (A) of said driver circuit, which said driver circuit comprises a logic circuit consisting of:

a first section (1) which provides data latches and a second section (2) which provides compensation for a pulse width pre-distortion, a third section (3) which provides a muxing circuit, and a forth section (4) for clock distribution in said driver circuit, and, after coupling said driver circuit to said high speed data link to receive said data at said data input pin, then controlling jitter on the driver circuit by using a bit time derived from a clock splitter (SPLTR) in said driver circuit for cycling bits of data through said driver circuit by:

storing in said first section (1) the said high speed data that is being sent and also storing a history of two bits of said high speed data which have just preceeded the said high speed data that is being sent through said driver circuit using a bit time derived from said clock splitter (SPLTR) in said fourth section (4) of said driver circuit; and skewing said stored history of two bits of said high speed data which have just preceeded the said high speed data by one half of the cycle of the bit time derived from said clock splitter (SPLTR) of said driver circuit; and then passing the said high speed data to the third section (3) which provides a muxing circuit and serializing the data by passing the said high speed data through said muxing circuit with the timing for the stored two bits of said high speed data history being skewed as well as that of the said high speed data serialized through the muxing circuit being provided by said fourth section; and after said skewing and serialization steps, using the second section to sample the information in the first section and then adjusting the timing derived from said clock splitter in said circuit for cycling more bits of high speed data through said said forth section to compensate the serialization of the third section for jitter.

2. The method according to claim 1, wherein after the compensation for jitter a fifth section (5) is used for providing a logic test for the driver circuit.

* * * * *

UNITED STATES PATENT AND TRADEMARK OFFICE
CERTIFICATE OF CORRECTION

PATENT NO. : 6,384,661 B1
DATED : May 7, 2002
INVENTOR(S) : Robert R. Livolsi

It is certified that error appears in the above-identified patent and that said Letters Patent is hereby corrected as shown below:

Title page,
Item [57], ABSTRACT,
Line 6, change "pre-destorted" to -- pre-distorted --
Line 12, change "forth" to -- fourth --

Column 1,
Line 4, insert
-- GOVERNMENT RIGHTS
 This invention was made with Government support under subcontract B338307 under prime contract W-7405-ENG-48 awarded by the Department of Energy. The Government has certain rights in this invention. --
Line 48, "t he" should be -- the --
Line 56, change "pre-destorted" to -- pre-distorted --
Line 61, change "forth" to -- fourth --

Column 2,
Lines 7 and 58, change "forth" to -- fourth --
Lines 21-25, delete entire paragraph
Line 46, change "collapses" to -- collapse --

Column 3, line 56 - Column 4, line 2,
Delete entire paragraph and replace with -- As shown in section four (4), the control input signals, GATE2, GATE1 are control inputs respectively to clock splitting logic circuit SPLTR1; inputs, B and C, and control input, GATE3, as control input to clock splitting logic circuit SPLTR1; control inputs GATEB, GATEC, and primary input CLOCK as driving forcing function to the clock splitting logic circuit SPLTR1; primary input OSC, respectively producing latch clocks ZC and ZB as respective clocks to the B and C input pins of data latches; L1, L2, L3, L4, L5, L6, L9, L10, and pattern detection latches; L7 and L8. And primary input CLOCK, as the input to pin A of logic gate BUF1, whose output, Z is the clock signal to the respective A inputs of variable delay elements, DLY1 and DLY2 whose respective outputs drive select inputs, SD, of data muxing logic circuits MUX1, MUX2 and MUX3, MUX4 respectively. --

UNITED STATES PATENT AND TRADEMARK OFFICE
CERTIFICATE OF CORRECTION

PATENT NO.    : 6,384,661 B1
DATED         : May 7, 2002
INVENTOR(S)   : Robert R. Livolsi It is certified that error appears in the above-identified patent and that said Letters Patent is hereby corrected as shown below:

Column 4,
Lines 27 and 58, change "forth" to -- fourth --
Line 31, change "controling" to -- controlling --

Signed and Sealed this

Twenty-seventh Day of May, 2003

JAMES E. ROGAN
*Director of the United States Patent and Trademark Office*